(12) United States Patent
Nishitani et al.

(10) Patent No.: US 9,382,949 B2
(45) Date of Patent: Jul. 5, 2016

(54) SHAFT COUPLING STRUCTURE

(71) Applicant: SUMITOMO HEAVY INDUSTRIES, LTD., Tokyo (JP)

(72) Inventors: Yuichi Nishitani, Obu (JP); Tetsuzo Ishikawa, Obu (JP); Yoshitaka Shizu, Obu (JP); Sakae Mitsufuji, Obu (JP); Shinichi Nishibe, Obu (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 62 days.

(21) Appl. No.: 14/083,884

(22) Filed: Nov. 19, 2013

(65) Prior Publication Data

US 2014/0147196 A1    May 29, 2014

(30) Foreign Application Priority Data

Nov. 29, 2012  (JP) ................................. 2012-261762

(51) Int. Cl.
| | | |
|---|---|---|
| *B25G 3/28* | (2006.01) | |
| *F16D 1/08* | (2006.01) | |
| *F16H 1/32* | (2006.01) | |

(52) U.S. Cl.
CPC ................ *F16D 1/0864* (2013.01); *F16D 1/08* (2013.01); *F16H 2001/323* (2013.01); *F16H 2001/325* (2013.01); *Y10T 403/535* (2015.01); *Y10T 403/7018* (2015.01)

(58) Field of Classification Search
CPC ....... F16D 1/04; F16D 1/0829; F16D 1/0847; F16D 1/0852; F16D 1/0864; F16D 1/087; F16D 1/08; F16D 1/0805; Y10T 403/535; Y10T 403/7018; Y10T 403/7081; F16H 2001/323; F16H 2001/325
See application file for complete search history.

(56) References Cited

U.S. PATENT DOCUMENTS

| | | | | |
|---|---|---|---|---|
| 836,706 | A * | 11/1906 | Richards | 403/373 |
| 3,131,956 | A * | 5/1964 | Bailey | 403/26 |
| 3,160,429 | A * | 12/1964 | Martins | 403/370 |
| 3,501,183 | A * | 3/1970 | Stratienko | 403/370 |
| 3,583,356 | A * | 6/1971 | Barker | 440/82 |
| 3,608,860 | A * | 9/1971 | Horn | 251/79 |

(Continued)

FOREIGN PATENT DOCUMENTS

| | | |
|---|---|---|
| JP | 46-13866 Y1 | 5/1971 |
| JP | 54-67601 | 5/1979 |

(Continued)

OTHER PUBLICATIONS

English language machine translation of Japanese patent document JP 2009-257543 (cited by Applicant in IDS filed Nov. 19, 2013); espacenet.com; retrieved May 15, 2015.*

*Primary Examiner* — Daniel P Stodola
*Assistant Examiner* — Matthew R McMahon
(74) *Attorney, Agent, or Firm* — Squire Patton Boggs (US) LLP

(57) ABSTRACT

In a shaft coupling structure in which a first shaft and a second shaft are coupled with each other by a combination of a key coupling and a clamp coupling, the first shaft has a cylindrical portion into which the second shaft is inserted and slits which are formed in the cylindrical portion by cutting off portions thereof in the axial direction, and a clamping fastener is mounted on portions of the outer circumference of the first shaft in which the slits are formed and the slit can be also used as a keyway of the key, and the plurality of slits are formed in the circumferential direction.

5 Claims, 4 Drawing Sheets

(56) References Cited

U.S. PATENT DOCUMENTS

| | | | |
|---|---|---|---|
| 4,019,824 A * | 4/1977 | Percy | 403/261 |
| 4,068,965 A * | 1/1978 | Lichti | 403/313 |
| 4,142,811 A * | 3/1979 | Burnham | 403/290 |
| 4,217,061 A * | 8/1980 | Eiland et al. | 403/313 |
| 4,753,462 A * | 6/1988 | Liu | 285/420 |
| 4,848,951 A * | 7/1989 | Boogerman et al. | 403/24 |
| 5,006,007 A * | 4/1991 | Fischer et al. | 403/290 |
| 5,052,842 A * | 10/1991 | Janatka | 403/14 |
| 5,067,845 A * | 11/1991 | Schlueter | 403/344 |
| 5,255,551 A * | 10/1993 | Vetter | 72/290 |
| 5,293,798 A * | 3/1994 | Otani et al. | 83/504 |
| 5,469,958 A * | 11/1995 | Gruettner et al. | 198/834 |
| 5,941,653 A * | 8/1999 | Cipriani | 403/344 |
| 6,074,125 A * | 6/2000 | Krawczak | 403/374.3 |
| 6,413,006 B1 * | 7/2002 | Neugart | 403/344 |
| 6,682,432 B1 * | 1/2004 | Shinozuka | 464/78 |
| 6,824,471 B2 * | 11/2004 | Kamenov | 464/182 |
| 7,975,523 B2 * | 7/2011 | Schneider | 72/481.1 |
| 2013/0058709 A1 * | 3/2013 | Tamura et al. | 403/288 |
| 2013/0164081 A1 * | 6/2013 | Hermes et al. | 403/343 |

FOREIGN PATENT DOCUMENTS

| | | |
|---|---|---|
| JP | 09-329111 A | 12/1997 |
| JP | 2009-257543 A | 11/2009 |
| JP | 2009-545480 | 12/2009 |

* cited by examiner

SHAFT COUPLING STRUCTURE

INCORPORATION BY REFERENCE

Priority is claimed to Japanese Patent Application No. 2012-261762, filed Nov. 29, 2012, the entire content of which is incorporated herein by reference.

BACKGROUND

1. Technical Field

The present invention relates to a shaft coupling structure.

2. Description of the Related Art

The related art discloses a shaft coupling structure in which a motor shaft is inserted into a hollow portion provided in an input shaft to be coupled with each other.

In the coupling structure, a keyway is formed in each of the input shaft and the motor shaft and a slit is formed in the input shaft, and the input shaft and the motor shaft are coupled with each other by the combination of a key coupling and a clamp coupling. Power transmission is performed via the key and the keyway, and the clamp bridges a gap between the key and the keyway, thereby contributing to reduction in vibration and noise.

SUMMARY

According to an embodiment of the present invention, there is provided a shaft coupling structure in which a first shaft and a second shaft are coupled with each other by the combination of a key coupling and a clamp coupling. The first shaft has a cylindrical portion into which the second shaft is inserted and a slit which is formed in the cylindrical portion by cutting off a portion thereof in the axial direction, and a clamping fastener is mounted on a portion of the outer circumference of the first shaft in which the slit is formed and the slit can be also used as a keyway of the key. A plurality of the slits are formed in the circumferential direction.

BRIEF DESCRIPTION OF THE DRAWINGS

FIG. 3A illustrates a cross-sectional view of the input shaft taken along a line perpendicular to the axis and FIG. 3B illustrates a cross-sectional view of the vicinity of a cylindrical portion.

DETAILED DESCRIPTION

Since the coupling structure described above was required to have the keyway and the slit formed individually, costs were likely to become high.

In certain embodiments of the present invention, it is desirable to provide a shaft coupling structure in which a coupling can be performed at low costs by the combination of a key coupling and a clamp coupling.

In the certain embodiments of the present invention, a slit is formed in a cylindrical portion of a first shaft by cutting off a portion thereof in the axial direction, and the slit serves to obtain a diameter reduction allowance for the action of clamping and also as a keyway. For this reason, there is no need for individually forming the clamping slit and the keyway, thereby facilitating easy processing and low costs.

Hereinafter, an exemplary embodiment of the present invention will be described in detail with reference to the accompanying drawings.

Figure 1:
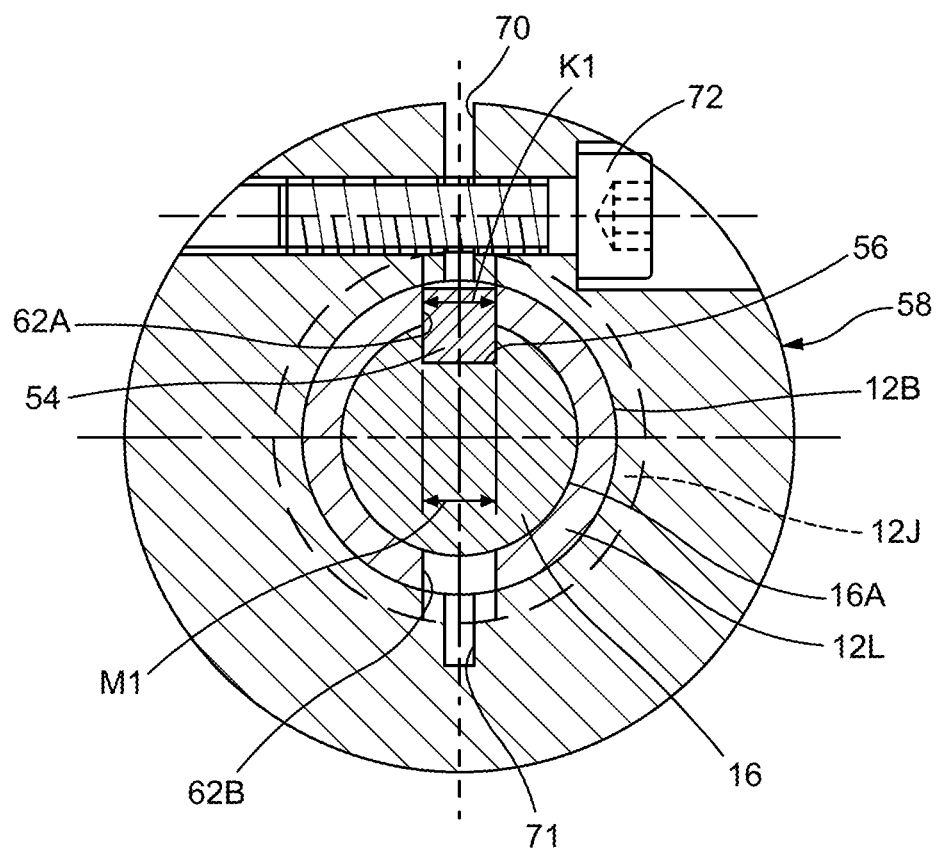
FIG. 1 illustrates a main part of a shaft coupling structure according to an exemplary embodiment of the present invention, and is an enlarged cross-sectional view taken along line I-I in FIG. 2.
Figure 2:
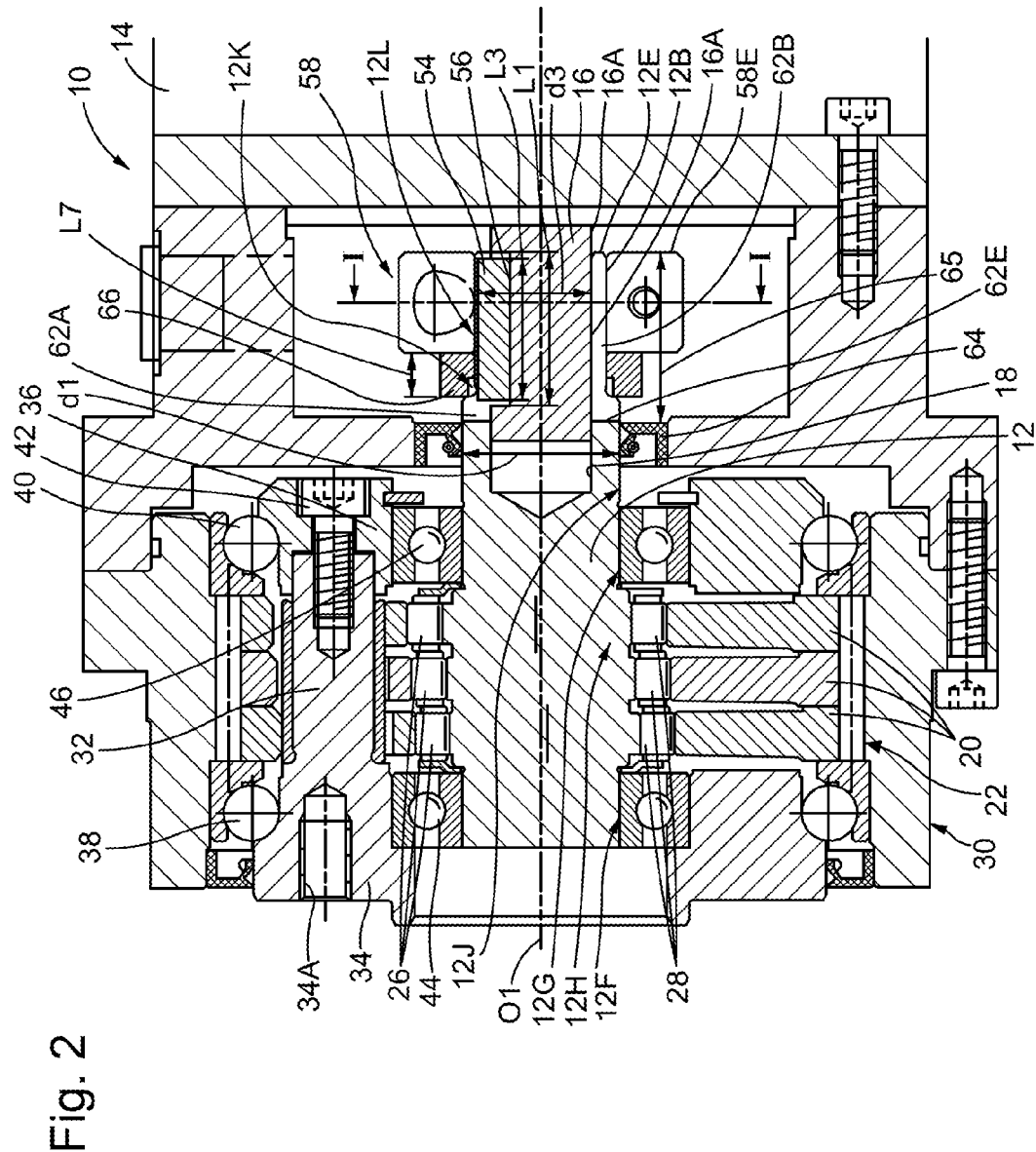
FIG. 2 is a cross-sectional view illustrating an exemplary configuration in which the shaft coupling structure according to the exemplary embodiment of the present invention is applied to a coupling between a motor shaft of a motor and an input shaft of a speed reducer.

FIG. 2 is a cross-sectional view illustrating an exemplary configuration in which a shaft coupling structure according to an exemplary embodiment of the present invention is applied to a coupling between a motor shaft of a motor and an input shaft of a speed reducer. FIG. 1 is an enlarged cross-sectional view taken along line I-I in FIG. 2.

A coupling structure between an input shaft 12 (a first shaft) of a speed reducer 10 and a motor shaft 16 (a second shaft) of a motor 14 will be described later, and, first, a schematic configuration of the power transmission system of the speed reducer 10 will be briefly described with reference to FIG. 2.

The speed reducer 10 is a speed reducer which is called an eccentric oscillation type and is widely used in the joint drive of a robot and the drive system of a machine tool. The input shaft 12 of the speed reducer 10 is arranged in the position of a shaft center O1 of an internal gear 22. An eccentric body 26 is integrally formed with the input shaft 12. An external gear 20 is assembled onto the outer circumference of the eccentric body 26 via a roller 28. The external gear 20 internally meshes with the internal gear 22. The internal gear 22 is integrated with a casing 30. The external gear 20 has the number of teeth less (as less as 1 in this example) than the number of teeth of the internal gear 22.

A pin-shaped member 32 passes through each of the external gears 20. On both sides of the external gear 20 in the axial direction, a pair of a first carrier 34 and a second carrier 36 are rotatably supported by the casing 30 via bearings 38 and 40. The first carrier 34 and the second carrier 36 are coupled with each other via the pin-shaped member 32 and a bolt 42. A driven member not illustrated is coupled with the first carrier 34 via a tap hole 34A. The input shaft 12 of the speed reducer 10 is supported by the first carrier 34 and the second carrier 36 via ball bearings 44 and 46.

An operation of the power transmission system of the speed reducer 10 will be briefly described.

When the input shaft 12 is rotated, the eccentric body 26 integrated with the input shaft 12 is rotated and the external gear 20 is oscillated via the roller 28. As a result, a phenomenon occurs in which a meshing position of the external gear 20 sequentially shifts with respect to the internal gear 22. Since the number of teeth of the external gear 20 is at least one fewer than the number of teeth of the internal gear 22, the external gear 20 shifts at least one tooth out of phase with respect to the internal gear 22 every time when the input shaft 12 is rotated (makes a rotation). The rotational component is transmitted to the first carrier 34 and the second carrier 36 via the pin-shaped member 32, thereby driving the driven member which is coupled with the drive member via the first carrier 34 and the tap hole 34A.

Subsequently, with reference to FIGS. 1 to 3B, the coupling structure between the input shaft 12 (the first shaft) of the speed reducer 10 and the motor shaft 16 (the second shaft) of the motor 14 according to the embodiment will be described in detail.

The motor shaft 16 of the motor 14 has a keyway 56 formed in an outer circumference 16A thereof along the axial direction. The keyway 56 is formed to have a length L1 slightly longer than a length L3 of a key 54. On the other hand, the input shaft 12 has a bottomed cylindrical portion 18, into which the motor shaft 16 is inserted, on a side opposite to a load side in the axial direction (on the motor 14 side) and has a slit 62 which is formed in the cylindrical portion 18 by cutting off a portion thereof in the axial direction.

Two slits 62 (in a plural number) are formed with a phase difference of 180 degree in the circumferential direction (a first slit 62A and a second slit 62B), and a clamping fastener 58 is mounted on portions of the outer circumference of the input shaft 12 in which each of the slits 62 is formed. The first slit 62A, which is one of the slits 62, can be also used as a keyway of the key 54 and also serves as a slit for providing a clamp tightening allowance along with the second slit 62B which is another slit. That is, in the embodiment, a key is not arranged in the second slit 62B, but keys may be arranged in both of the first slit 62A and the second slit 62B.

To describe more specifically, the input shaft 12 is mainly configured to have two bearing support portions 12F and 12G (a first bearing support portion and a second bearing support portion) supported by the ball bearings 44 and 46; an eccentric body formation portion 12H with which the eccentric body 26 pinched between the first bearing support portion 12F and the second bearing support portion 12G is integrally formed; a large-diameter portion 12J which is extended from the second bearing support portion 12G on the motor 14 side to have the same outer diameter d1 throughout the overall length of the large-diameter portion, and around which an oil seal 64 arranged; and a small-diameter portion 12L which is further extended via a step portion 12K from the large-diameter portion 12J to have an outer diameter (d3) smaller than the outer diameter d1. In the embodiment, the (bottomed) cylindrical portion 18 is configured to have the large-diameter portion 12J, the step portion 12K and the small-diameter portion 12L.

Figure 3B:
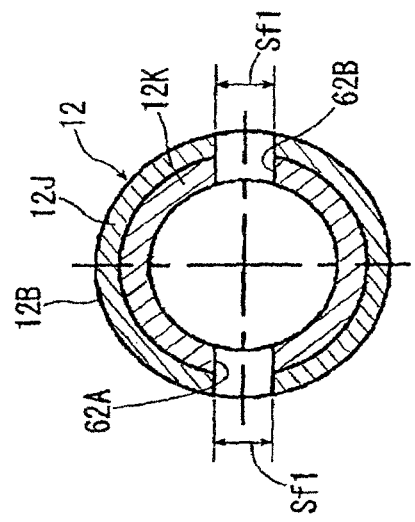
FIGS. 3A and 3B illustrate a configuration of the input shaft.
Figure 3A:
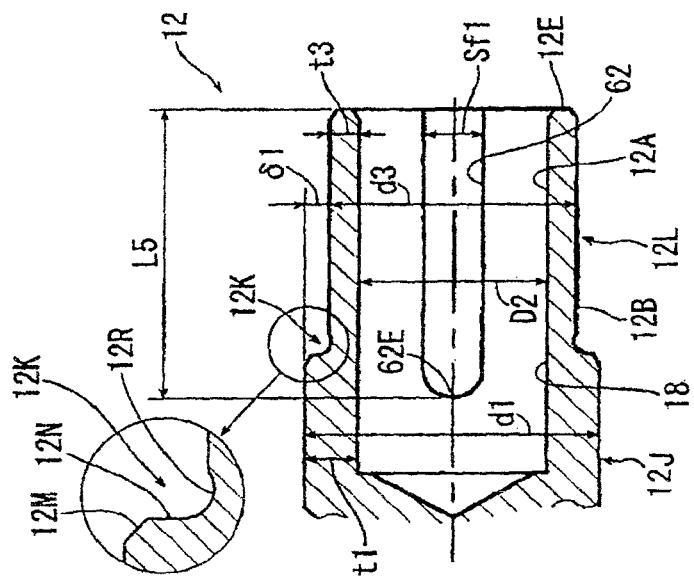

As illustrated in FIGS. 3A and 3B, since the cylindrical portion 18 has an inner diameter D2 identical with the inner diameters of the large-diameter portion 12J and the small-diameter portion 12L, the wall thickness of the small-diameter portion 12L becomes as thinner as a radius difference δ1 than the wall thickness of the large-diameter portion 12J. That is, the wall thickness of the large-diameter portion 12J is t1 and the wall thickness of the small-diameter portion 12L is t3, and t1 is larger than t3.

In addition, as illustrated in an enlarged circle of FIG. 3A, the step portion 12K between the large-diameter portion 12J and the small-diameter portion 12L has a chamfered portion 12M formed from the large-diameter portion 12J; a spacer contact portion 12N for locating a spacer 66 to be described below; and a round portion 12R for preventing concentration of stress. The step portion 12K continues to be formed to the small-diameter portion 12L via the round portion 12R.

The input shaft 12 and the motor shaft 16 are coupled with each other in an area of the small-diameter portion 12L. However, both of the first slit 62A and the second slit 62B are formed across both of the small-diameter portion 12L and the large-diameter portion 12J by cutting off portions of not only the small-diameter portion 12L but also the large-diameter portion 12J (up to a length L5 in the axial direction).

The first slit 62A and the second slit 62B have the same width Sf1 before clamp tightening is performed. The first slit 62A and the second slit 62B in a free state have the width Sf1 larger than a width K1 of the key 54. Accordingly, potential functions of the first slit 62A and the second slit 62B are completely identical with each other, and both slits can serve as a keyway of the key 54 and a diameter reduction allowance of the input shaft 12 when clamp tightening is performed (both slits are capable of performing both functions). In the embodiment, since the key 54 is inserted into only one of the slits, for example, only the first slit 62A, the other slit, that is, the second slit 62B serves only as a diameter reduction allowance.

In addition, in the embodiment, after clamp tightening is completed, the first slit 62A and the second slit 62B are also set to have a width Sc1 larger than the width K1 of the key 54. That is, in the embodiment, considerations are taken into account in such a manner that the first slit 62A does not come into contact with both sides of the key 54 while the clamp tightening is performed and thus a diameter reduction allowance of the input shaft 12 becomes non-zero (in such a manner that an intended tightening operation can be reliably performed all the way through the operation).

In the embodiment, after clamping is completed, the first slit 62A and the second slit 62B are set to have the width Sc1 identical with a width M1 (refer to FIG. 1) of the keyway 56 of the motor shaft 16 (Sc1≅M1). However, after clamp tightening is completed, the first slit 62A and the second slit 62B are not necessarily required to have the width Sc1 identical with the width M1 of the keyway 56 of the motor shaft 16, for example, may be set to have the width Sc1 larger than the width M1 of the keyway 56 of the motor shaft 16.

The fastener 58 for the clamp coupling is mounted on portions of an outer circumference 12B of the input shaft 12 in which the slits 62 (the first slit 62A and the second slit 62B) are formed. The fastener 58 has slit portions 70 and 71 for diameter reduction and tightens the input shaft 12 from the radial outside by tightening a bolt 72, thereby reducing the diameter of the input shaft 12. In the embodiment, tightening is performed in a state where the slit portion 70 of the fastener 58 is placed in the same circumferential position as the position where the first slit 62A is placed and the slit portion 71 of the fastener 58 is placed in the same circumferential position as the position where the second slit 62B is placed.

With reference to FIG. 2 again, the spacer 66 is arranged between the clamping fastener 58 and the large-diameter portion 12J of the input shaft 12 (therebetween in the axial direction). Since the spacer 66 locates the fastener 58 at a position as apart as an axial length L7 of the spacer 66 from the spacer contact portion 12N of the step portion 12K, the spacer 66 is intended to make the clamp tightening be performed at a position as much apart as possible from the large-diameter portion 12J (or, a formation end portion 62E of the first slit 62A and the second slit 62B). In the embodiment, the position, specifically, corresponds to an axial position where an end surface 12E of the input shaft 12 is coincided with an end surface 58E of the fastener 58.

Subsequently, an operation of the shaft coupling structure will be described.

When the input shaft 12 is coupled with the motor shaft 16 using the shaft coupling structure according to the embodiment, both a coupling using the key 54 and a clamp coupling using the fastener 58 are used.

That is, first, the key 54 is inserted into the keyway 56 of the motor shaft 16, the circumferential position of the key 54 is aligned with the position of the first slit 62A of the input shaft 12, and then the motor shaft 16 is inserted into the cylindrical portion 18 of the input shaft 12. Thereafter, with the intervention of the spacer 66, the fastener 58 is fitted onto portions of the outer circumference of the input shaft 12 where the first slit 62A and the second slit 62B are formed, and the slit portions 70 and 71 of the fastener 58 have a width reduced by screwing the bolt 72. As a result, the input shaft 12 receives strong diameter reduction force from the radial outside and is coupled with an outer circumference 16A of the motor shaft 16 by strong frictional tightening force.

In the embodiment, since the first slit 62A and the second slit 62B serve both as a slit for ensuring a diameter reduction allowance for the action of clamping and as a slit for a keyway, the slit and the keyway are not required to be individually processed and thus processing costs can be reduced. In particular, in the embodiment, since the first slit 62A and the second slit 62B have the same width Sf1 (before clamp tightening is performed) and are formed with a phase difference of 180 degree, the slits can be continuously processed using the same tool. For this reason, the processing is much easily facilitated, and the processing costs can be further reduced. In addition, since a plurality of the slits are formed in the circumferential direction (in the embodiment, two slits with a phase difference of 180 degree), diameter reduction of the input shaft 12 can be uniformly performed substantially throughout the overall circumference thereof, and stress concentration can be mitigated compared to when the input shaft 12 has only one slit.

In addition, since the input shaft 12 has the small-diameter portion 12L and the large-diameter portion 12J and the first slit 62A is formed across both of the small-diameter portion 12L and the large-diameter portion 12J, the small-diameter portion 12L can be sufficiently deformed without deteriorating the strength of the input shaft 12, and compactability of the overall input shaft 12 can be improved.

In addition, since the spacer 66 is arranged between the clamping fastener 58 and the large-diameter portion 12J, the fastener 58 can be easily located at a position where the end portion of the input shaft 12 is placed. Accordingly, the clamping position is far off from the large-diameter portion 12J, and thus the small-diameter portion 12L of the input shaft 12 can be deformed by small tightening force and the clamp tightening can be stably performed.

In the embodiment, since the first slit 62A is set to have the width Sc1 larger than the width K1 of the key 54 after clamp tightening is completed, there is no possibility that the first slit 62A (as a keyway) comes into contact with both sides of the key 54 while the clamp tightening is performed and thus the tightening is not further performed. In the embodiment, even after the clamp tightening is completed, since there is a gap (Sc1-K1) between the key 54 and the first slit 62A (as a keyway), the key 54 does not contribute to power transmission between the motor shaft 16 and the input shaft 12 (during a normal operation).

In this respect, for example, the embodiment greatly differs in the technical ideas of the coupling from a structure with a combination of the key and the clamping in the related art described above. That is, in the coupling structure of the related art, "power transmission is basically performed via the key, and the clamp tightening bridges a gap between the key and the keyway (positive insertion of the key), thereby preventing vibration and noise from occurring". Accordingly, the key takes the role of the power transmission.

However, in the configuration of the related art, the width of the "keyway" is changed due to diameter reduction of the input shaft and thus the dimensions thereof cannot be easily controlled, and there is a concern that, on occasion, regardless of strong tightening force being concentrated in the vicinity of the key and the keyway, a gap still remains between the outer circumference of the motor shaft and the inner circumference of the input shaft; or, on the contrary, regardless of strong frictional tightening force already occurring between the outer circumference of the motor shaft and the inner circumference of the input shaft, a gap still remains between the key and the keyway.

In contrast, in the embodiment, the first slit 62A (as a keyway) in a free state has the width Sf1 larger than the width K1 of the key 54, and, after clamp tightening is completed, the first slit 62A (as a keyway) also has the width Sc1 larger than the width K1 of the key 54. For this reason, diameter reduction of the input shaft 12 by the clamp tightening can be completed with a gap being held between the first slit 62A (as a keyway) and the key 54, and intended frictional tightening force can reliably occur between the motor shaft 16 and the input shaft 12. Accordingly, since power transmission is performed by the clamp coupling (not by a coupling by the key 54), the merits of the clamp coupling such as the non-existence of backlash, small vibration and noise can be fully enjoyed.

On the other hand, even in case frictional transmission force is lost between the motor shaft 16 and the input shaft 12 due to unknown causes, a coupling by the key 54 serves as backup, thereby preventing a driven machine coupled with the drive member from unexpectedly behaving.

Figure 4:
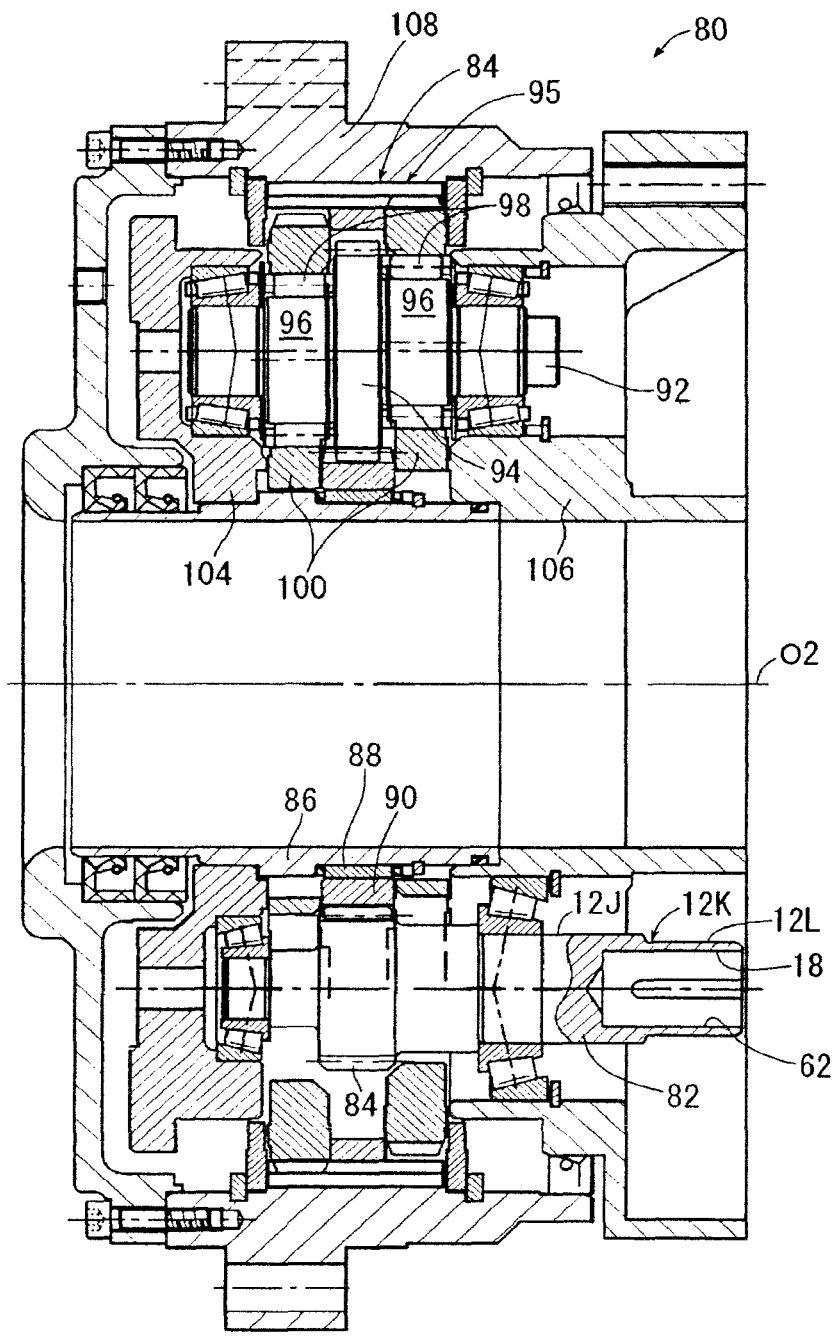
FIG. 4 illustrates a cross-sectional view of a speed reducer according to another exemplary embodiment of the present invention.

In the embodiment described above, the embodiment of the present invention is applied to the speed reducer 10 provided with a shaft (input shaft 12) having one eccentric body in the shaft center O1 of the internal gear 22, but, in certain embodiments of the present invention, a configuration of an apparatus having the first shaft is not particularly limited to the speed reducer 10 described above and, for example, the configuration can be applied to a coupling between the motor shaft 16 (not illustrated in FIG. 4) and an input shaft 82 of a speed reducer 80 having a configuration illustrated in FIG. 4.

In the speed reducer 80, an input gear 84 is integrally formed with the input shaft 82. The input gear 84 meshes with a center gear 90 rotatably supported by the outer circumference of a cylindrical body 86 via a needle bearing 88. The center gear 90 meshes with an eccentric body shaft gear 94 for driving an eccentric body shaft 92. A plurality of the eccentric body shafts 92 are provided (3 pieces in this example: only 1 piece illustrated in FIG. 4) at circumferential positions offset from a shaft center O2 of an internal gear 95. An eccentric body 96 is integrally formed with each of the eccentric body shafts 92, and an external gear 100 is assembled onto the outer circumference of the eccentric body 96 via a roller 98. The external gear 100 internally meshes with the internal gear 95.

In the speed reducer 80, when the input shaft 82 is rotated due to a coupling with the motor shaft 16, the center gear 90 is rotated via the input gear 84, the eccentric body shaft gears 94 provided in the plurality of eccentric body shafts 92 are synchronized to be rotated in the same direction. For this reason, the eccentric body 96 integrally formed on each of the eccentric body shafts 92 is synchronized to be rotated, thereby oscillating the external gear 100. When the external gear 100 is oscillated, a relative rotation (corresponding to a difference in the number of tooth between the external gear 100 and the internal gear 95) occurs between the external gear 100 and the internal gear 95, the eccentric body shafts 92 revolve about the shaft center O2 of the internal gear 95 by the relative rotation, and thus the resultant revolution can be outputted from a first carrier 104 and a second carrier 106 arranged on both sides of the external gear 100 in the axial direction. The example of FIG. 4 is configured to drive a driven body which is not illustrated and is coupled with the second carrier 106. In another way, the second carrier 106 is fixed and thus a casing 108 can be rotated.

Even in the speed reducer 80, as is apparent from a comparison with FIG. 3A, the input shaft 82 on the motor side can be configured to have the same configuration as the configuration of the input shaft 12 on the motor side in the first embodiment, and the same operational effects as the first embodiment can be obtained. For convenience, in the input shaft 82, the same reference numerals and signs are assigned to portions considered as identical with portions in FIGS. 3A and 3B.

As such, certain embodiments of the present invention can be applied to a coupling between various types of shafts, and it is not particularly specified that a shaft is assembled into any portion of any apparatus. That is, certain embodiments of the present invention may not necessarily be a coupling between a motor shaft and an input shaft of a speed reducer and, in summary, can be applied to a coupling as far as the coupling is performed in such a manner that a first shaft and a second shaft are coupled with each other by inserting the second shaft into a cylindrical portion of the first shaft.

In the embodiments described above, the two slits (the first slit 62A and the second slit 62B) are formed with a phase difference of 180 degree in the circumferential direction, but, in certain embodiments of the present invention, the number of the slit is not necessarily limited to 2 and, for example, three slits may be formed at an angular interval of 120 degree and four or more slits may be formed. When the number of the slit is increased, machining man-hour is increased as many as the increased number of the slit, but justifiable merits are obtained from the viewpoint of uniform tightening and thus increasing the number of the slit is not necessarily excluded from certain embodiments of the present invention.

In addition, in the embodiments described above, the first shaft (input shaft 12) has the small-diameter portion and the large-diameter portion and the slit is configured to be formed across both of the small-diameter portion and the large-diameter portion, but this configuration is not necessarily required and, for example, the first shaft may have the same diameter throughout the overall length thereof including the tightened portion. In particular, when a plurality of slits are formed, the first shaft tends to be easily deformed and thus there is a case where diameter reduction can be satisfactorily performed even in the input shaft with the same diameter throughout the overall length thereof (intentionally without the small-diameter portion being provided). In this case, since a concept itself called the small-diameter portion and the large-diameter portion is not required, a concept that the slit is formed across both of the small-diameter portion and the large-diameter portion is not required, a concept that the round portion is formed in the step portion between the small-diameter portion and the large-diameter portion is not required, thereby mitigating the occurrence of stress concentration only in a portion of the input shaft in the axial direction.

In addition, in the embodiments described above, even after clamp tightening is completed, the first slit 62A of the input shaft 12 is set to have the width Sc1 larger than the width K1 of the key 54 (Sc1>K1) in such a manner that (the clamp tightening is reliably performed all the way through the operation and) power transmission is performed only by frictional engagement force.

However, in certain embodiments of the present invention, a reversal of the magnitude relation (Sc1>K1) is not completely prohibited. That is, after clamp tightening is completed, the first slit 62A of the input shaft 12 may be designed to have the width Sc1 smaller than the width K1 of the key 54 (Sc1<K1). In this case, the clamping by the fastener 58 serves to bridge a gap between the key 54 and the first slit 62A. Accordingly, power transmission involving power transmission by the key can be achieved. However, even in this case, when frictional tightening force itself by the fastener is perfectly maintained and the power transmission is persistently performed on the basis of clamp tightening force, the appropriate setting of the dimensions of each member can be simply controlled.

In addition, in the embodiments described above, the round portion is formed in a connecting portion where the small-diameter portion and the large-diameter portion are connected to each other, but, in certain embodiments of the present invention, the round portion is not necessarily required to be formed in the connecting portion, and, for example, the small-diameter portion and the large-diameter portion may be linearly connected.

In addition, in the embodiments described above, the cylindrical portion (18) of the first shaft has the bottom, but, according to certain embodiments of the present invention, the cylindrical portion is not limited to a bottomed cylindrical portion and may be configured to have a hollow portion which passes through the first shaft.

It should be understood that the invention is not limited to the above-described embodiment, but may be modified into various forms on the basis of the spirit of the invention. Additionally, the modifications are included in the scope of the invention.

What is claimed is:

1. A shaft coupling structure comprising:
   a first shaft; and
   a second shaft which is coupled with the first shaft by a combination of a key coupling and a clamp coupling,
   wherein the first shaft has a cylindrical portion into which the second shaft is inserted, a first slit which is formed in an axial direction in the cylindrical portion, and a second slit which is formed in the axial direction in the cylindrical portion, the second slit being formed apart from the first slit in a circumferential direction,
   the shaft coupling structure further comprising:
      a clamping fastener which is mounted on a portion of an outer circumference of the first slit and the second slit; and
      a key disposed within one of the first slit and the second slit,
      wherein a circumferential width of the first slit and a circumferential width of the second slit are constant in a full range in a radial direction,
      wherein the first shaft has a small-diameter portion and a large-diameter portion, and the first slit and the second slit are formed across both of the small-diameter portion and the large-diameter portion in the full range of the radial direction,
      wherein a spacer is arranged between the clamping fastener and the large-diameter portion,
      wherein a step portion between the small-diameter portion and the large-diameter portion has a spacer contact portion for locating the spacer, and
      wherein the spacer is in contact with the spacer contact portion.

2. The shaft coupling structure according to claim 1,
   wherein the first slit and the second slit are formed with a phase difference of 180 degree in the circumferential direction.

3. The shaft coupling structure according to claim 1,
   wherein among the first slit and the second slit, the slit with which the key is mounted has a gap to the key even after tightening of the clamp coupling is completed.

4. The shaft coupling structure according to claim 1,
   wherein the step portion between the large-diameter portion and the small-diameter portion has a chamfered portion formed continuously from the large-diameter portion, the spacer contact portion formed continuously from the chamfered portion, and a round portion formed between the spacer contact portion and the small-diameter portion.

5. The shaft coupling structure according to claim 1, wherein the first slit and the second slit are equal in both a length in the axial direction and a width in the circumferential direction.

* * * * *